United States Patent
Li et al.

(10) Patent No.: US 9,786,301 B1
(45) Date of Patent: Oct. 10, 2017

(54) APPARATUSES AND METHODS FOR PROVIDING THIN SHIELDS IN A MULTIPLE SENSOR ARRAY

(71) Applicant: Western Digital (Fremont), LLC, Fremont, CA (US)

(72) Inventors: Shaoping Li, San Ramon, CA (US); Gerardo A. Bertero, Redwood City, CA (US); Steven C. Rudy, Carmel Valley, CA (US); Shihai He, Fremont, CA (US); Ming Mao, Dublin, CA (US); Haiwen Xi, San Jose, CA (US); Srikanth Ganesan, Fremont, CA (US); Qunwen Leng, Palo Alto, CA (US); Ge Yi, San Ramon, CA (US); Rongfu Xiao, Dublin, CA (US); Feng Liu, San Ramon, CA (US); Lei Wang, Danville, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 0 days.

(21) Appl. No.: 14/557,941

(22) Filed: Dec. 2, 2014

(51) Int. Cl.
*G11B 5/39* (2006.01)
*G11B 5/11* (2006.01)
*G11B 5/60* (2006.01)
*G11B 5/115* (2006.01)

(52) U.S. Cl.
CPC ............... *G11B 5/11* (2013.01); *G11B 5/112* (2013.01); *G11B 5/115* (2013.01); *G11B 5/3912* (2013.01); *G11B 5/3951* (2013.01); *G11B 5/6005* (2013.01)

(58) Field of Classification Search
CPC ........... G11B 5/33; G11B 5/39; G11B 5/3903; G11B 5/3906; G11B 5/3912; G11B 5/3945; G11B 5/3948; G11B 5/3951; G11B 5/3958; G11B 5/3961; G11B 5/3964; G11B 5/115
USPC ................................ 360/314, 315, 316, 319
See application file for complete search history.

(56) References Cited

U.S. PATENT DOCUMENTS

| | | | |
|---|---|---|---|
| 4,012,781 | A | 3/1977 | Lin |
| 5,229,901 | A | 7/1993 | Mallary |
| 5,270,892 | A | 12/1993 | Naberhuis |
| 5,309,305 | A | 5/1994 | Nepela et al. |
| 5,388,014 | A | 2/1995 | Brug et al. |
| 5,684,658 | A | 11/1997 | Shi et al. |
| 5,696,654 | A | 12/1997 | Gill et al. |
| 5,721,008 | A | 2/1998 | Huang et al. |
| 5,796,535 | A | 8/1998 | Tuttle et al. |

(Continued)

OTHER PUBLICATIONS

Shaoping Li, et al., U.S. Appl. No. 13/928,799, filed Jun. 27, 2013, 27 pages.

*Primary Examiner* — Jefferson Evans
(74) *Attorney, Agent, or Firm* — Loza & Loza, LLP; Gabriel Fitch

(57) ABSTRACT

Apparatuses and methods for providing thin shields in a multiple sensor array are provided. One such apparatus is a magnetic read transducer including a first read sensor, a second read sensor, and a shield assembly positioned between the first read sensor and the second read sensor at an air bearing surface (ABS) of the magnetic read transducer, the shield assembly including a first shield layer assembly having a first footprint with a first area, and a second shield layer assembly having a second footprint with a second area, where the second area is greater than the first area.

28 Claims, 6 Drawing Sheets

(56) References Cited

U.S. PATENT DOCUMENTS

| | | |
|---|---|---|
| 5,831,888 A | 11/1998 | Glover |
| 5,838,521 A | 11/1998 | Ravipati |
| 5,963,400 A | 10/1999 | Cates et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,071,007 A | 6/2000 | Schaenzer et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,104,562 A | 8/2000 | Ottesen et al. |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,154,335 A | 11/2000 | Smith et al. |
| 6,157,510 A | 12/2000 | Schreck et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,191,925 B1 | 2/2001 | Watson |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,216,242 B1 | 4/2001 | Schaenzer |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,271,998 B1 | 8/2001 | Coehoorn et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,311,551 B1 | 11/2001 | Boutaghou |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,362,528 B2 | 3/2002 | Anand |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,449,131 B2 | 9/2002 | Guo et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,333 B1 | 12/2002 | Han et al. |
| 6,496,334 B1 | 12/2002 | Pang et al. |

(56) References Cited

U.S. PATENT DOCUMENTS

| | | |
|---|---|---|
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,674,618 B2 | 1/2004 | Engel et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,842,312 B1 | 1/2005 | Alstrin et al. |
| 6,859,343 B1 | 2/2005 | Alfoqaha et al. |
| 6,859,997 B1 | 3/2005 | Tong et al. |
| 6,861,756 B2 | 3/2005 | Saito et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,253 B1 | 5/2005 | Rogers et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,929,957 B2 | 8/2005 | Min et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,944,939 B2 | 9/2005 | Guo et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,106,549 B2 | 9/2006 | Asakura |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,130,165 B2 | 10/2006 | Macken et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,807 B1 | 3/2007 | Liikanen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,229,706 B2 | 6/2007 | Hasegawa et al. |
| 7,238,292 B1 | 7/2007 | He et al. |

(56) References Cited

U.S. PATENT DOCUMENTS

| | | |
|---|---|---|
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,259,927 B2 | 8/2007 | Harris |
| 7,271,970 B2 | 9/2007 | Tsuchiya |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,301,734 B2 | 11/2007 | Guo et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,315,072 B2 | 1/2008 | Watanabe |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,168 B2 | 5/2008 | Wu et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,390,584 B2 | 6/2008 | Daughton et al. |
| 7,405,907 B2 | 7/2008 | Raastad |
| 7,408,730 B2 | 8/2008 | Yamagishi |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,632 B2 | 10/2008 | Li et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,393 B2 * | 6/2009 | Biskeborn ............ G11B 5/4893 360/121 |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,868,362 B2 | 1/2011 | Randazzo et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,961,438 B2 | 6/2011 | Mizuno et al. |
| 7,968,219 B1 | 6/2011 | Jiang et al. |
| 7,974,048 B2 | 7/2011 | Shimazawa et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,139,301 B1 | 3/2012 | Li et al. |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,228 B2 | 6/2012 | Maat et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |

(56) References Cited

U.S. PATENT DOCUMENTS

| | | |
|---|---|---|
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,384,220 B2 | 2/2013 | Saito et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,542,456 B2 | 9/2013 | Yamane et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |

(56) References Cited

U.S. PATENT DOCUMENTS

| | | |
|---|---|---|
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,824,106 B1* | 9/2014 | Garfunkel et al. .......... 360/316 |
| 8,873,204 B1* | 10/2014 | Gao et al. .................... 360/319 |
| 8,908,333 B1* | 12/2014 | Rudy et al. .................... 360/319 |
| 8,970,988 B1* | 3/2015 | Li et al. ...................... 360/235.4 |
| 9,042,058 B1* | 5/2015 | Li et al. ...................... 360/316 |
| 9,042,059 B1* | 5/2015 | Katine ................. G11B 5/3909 360/316 |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2016/0005425 A1* | 1/2016 | McKinlay .............. G11B 5/265 360/121 |
| 2016/0055868 A1* | 2/2016 | Gao et al. ............ G11B 5/3932 360/75 |
| 2017/0092305 A1* | 3/2017 | Deen et al. ......... G11B 5/3912 |
| 2017/0098459 A1* | 4/2017 | Mastain ............... G11B 5/3912 |

\* cited by examiner

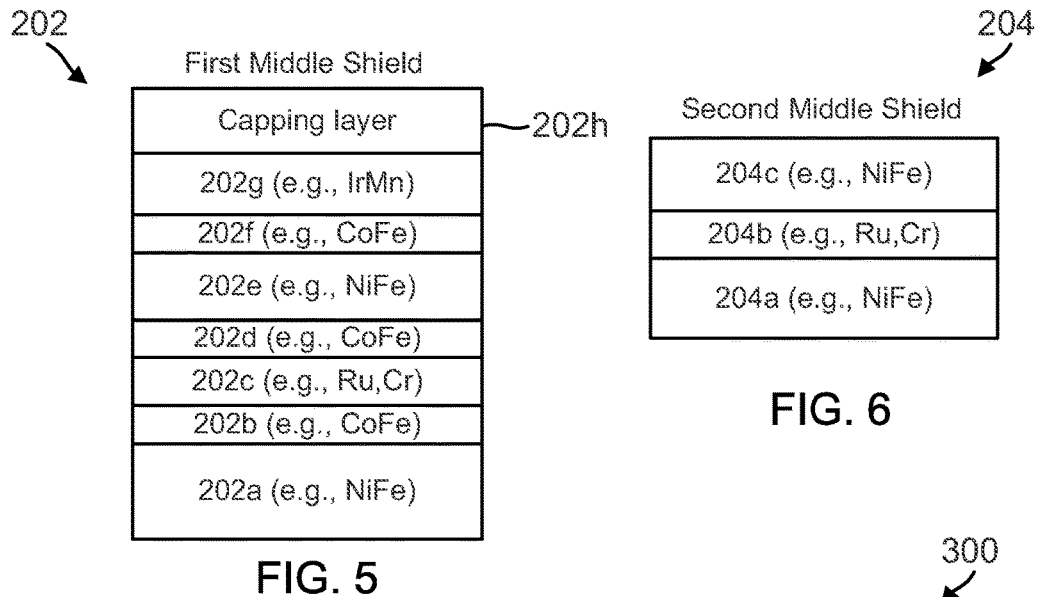
FIG. 5
FIG. 6
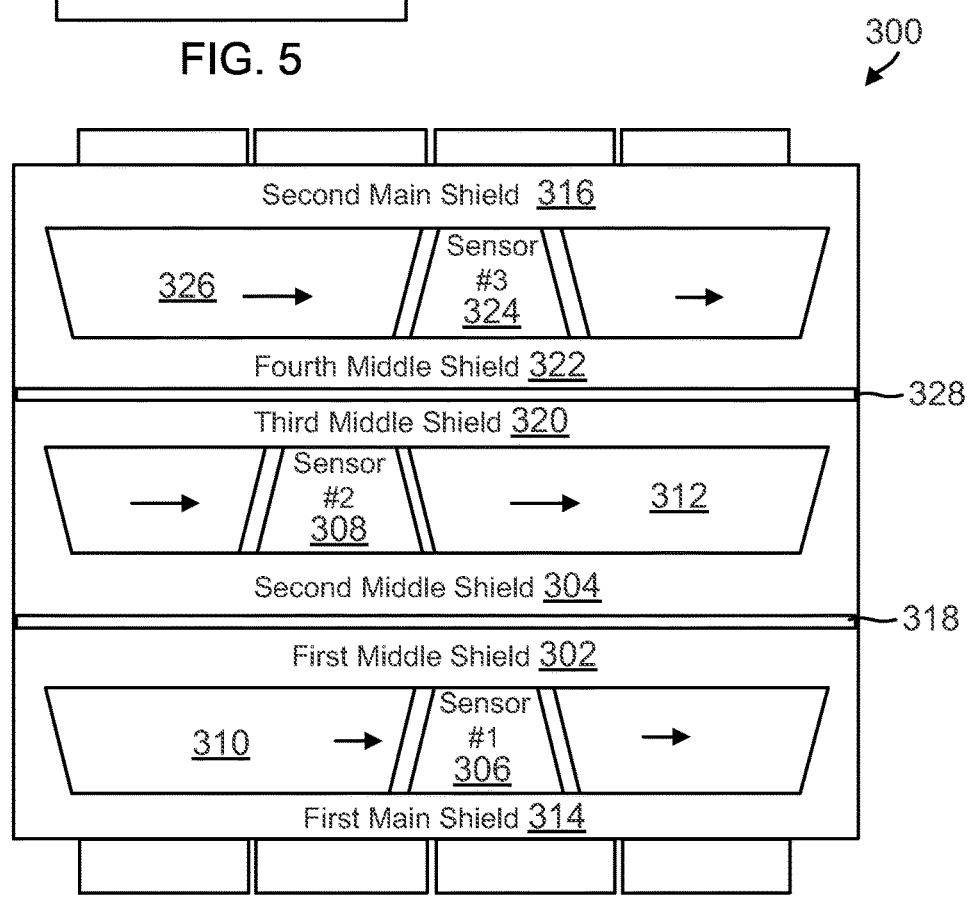
FIG. 7

APPARATUSES AND METHODS FOR PROVIDING THIN SHIELDS IN A MULTIPLE SENSOR ARRAY

BACKGROUND

Two dimensional magnetic recording (TDMR) technology employs multiple sensor arrays which can enable high density recording (e.g., multi-terabit density recording). This TDMR technology may bring the magnetic recording industry to new heights. However, it can be challenging to design sensor assemblies with multiple sensors positioned together. This is the case whether the sensor assemblies are vertically arranged or longitudinally arranged. More specifically, vertically arranged sensor arrays (such as those depicted in FIG. 3 and FIG. 7) are an inevitable choice for fabricating multi-sensor arrays for TDMR applications.

In practice, it is desirable to make the sensor arrays with very small vertical separation to reduce the skew sensitivity. This is due to the fact that vertically aligned sensor arrays could have misalignments between adjacent sensor locations and the actual tracks of interest at some skew angle and radius conditions. As it turns out, such misalignments are proportional to the vertical separation between two sensors. As a result, it is highly desirable to reduce the vertical separation between adjacent sensors.

BRIEF DESCRIPTION OF THE DRAWINGS

FIG. 5 is a side schematic view of the layer structure of the first middle shield assembly of FIG. 3 in accordance with one embodiment of the invention.

FIG. 6 is a side schematic view of the layer structure of the second middle shield assembly of FIG. 3 in accordance with one embodiment of the invention.

FIG. 7 is a bottom or air bearing surface (ABS) schematic view of a triple sensor array where the sensors are each separated by thin middle shields, including first, second, third and fourth middle shield assemblies, in accordance with one embodiment of the invention.

DETAILED DESCRIPTION

Figure 1:
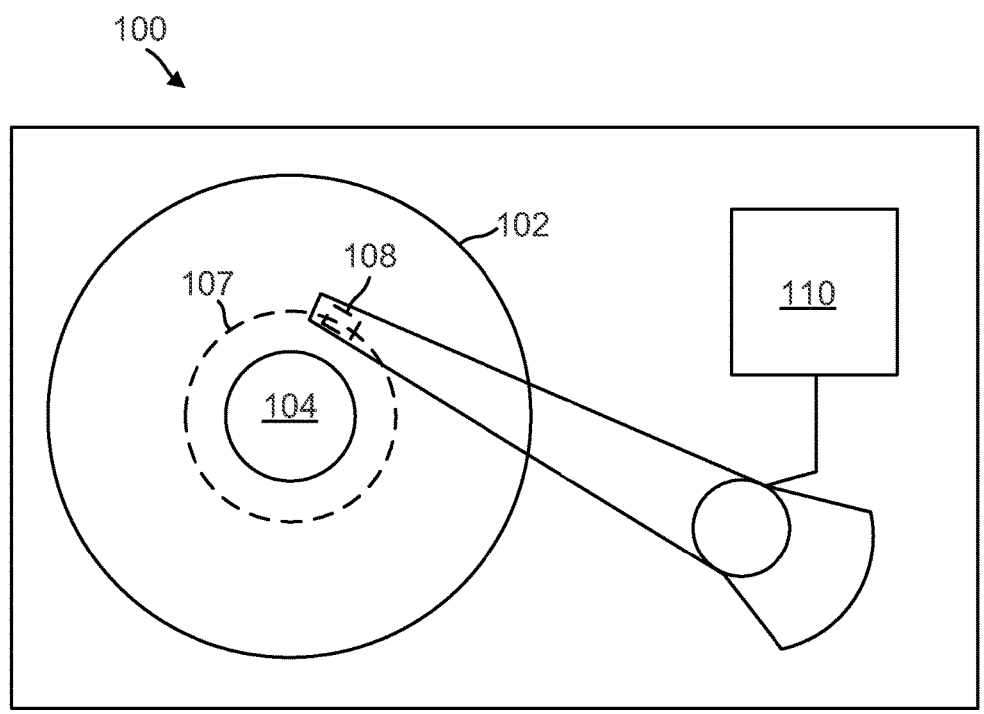
FIG. 1 is a top schematic view of a disk drive including a slider with a multiple sensor array having thin shields in accordance with one embodiment of the invention.

Referring now to the drawings, embodiments of sensor arrays (e.g., magnetic read transducers) and methods for forming such sensor arrays are illustrated. The magnetic read transducers can include a first read sensor, a second read sensor, and a shield assembly positioned between the first read sensor and the second read sensor at an air bearing surface (ABS) of the magnetic read transducer. The shield assembly can include a first shield layer assembly having a first footprint with a first area, and a second shield layer assembly having a second footprint with a second area, where the second area is greater than the first area. In such case, the thickness of the first and second shield layer assemblies can be substantially reduced as compared to shields in conventional sensor arrays. In several embodiments, the proposed thin shield structures, and in particular their unique shape anisotropy, can effectively reduce the shield to shield spacing and/or absorb the on-track noise while also stabilizing the magnetization of soft-bias layers.

In several embodiments, the first and second shield layer assemblies can be made of laminated soft ferromagnetic layers. In some embodiments, the number of layers for the first shield layer assembly and second shield layer assembly is not the same. In some embodiments, one of the sensors in the sensor array can be stabilized using a hybrid soft and hard bias scheme where a bias layer positioned along the same layer as the sensor can have both soft and hard bias elements contained therein. The hybrid soft and hard bias scheme can offset a loss in pinning strength associated with the reduction in thickness of various layers (e.g., an antiferromagnetic coupling, AFC, layer) in the shield assembly.

FIG. 1 is a top schematic view of a disk drive 100 including a slider 108 with a multiple sensor array having thin shields in accordance with one embodiment of the invention. Disk drive 100 may include one or more of the disks/media 102 to store data. Disks/media 102 reside on a spindle assembly 104 that is mounted to drive housing 106. Data may be stored along tracks 107 in the magnetic recording layer of disk 102. The reading and writing of data is accomplished with the slider/head 108 that can have both read and write elements. The write element (see 108a in FIG. 2) is used to alter the properties of the magnetic recording layer of disk 102 and thereby write information thereto. The reader element (see 108b in FIG. 2) is used to read information stored on the magnetic recording layer of disk 102. In several embodiments, the reader element can be a sensor array such as a two dimensional magnetic recording (TDMR) sensor array.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
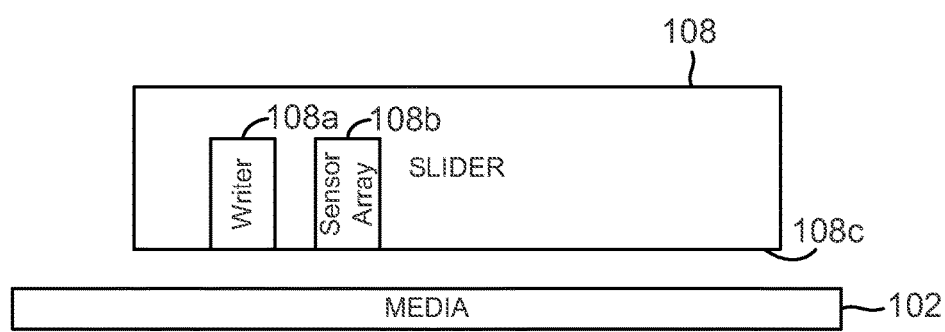
FIG. 2 is a side schematic view of the slider of FIG. 1 with the multiple sensor array having thin shields in accordance with one embodiment of the invention.

FIG. 2 is a side schematic view of the slider 108 of FIG. 1 with the multiple sensor array 108b having thin shields in accordance with one embodiment of the invention. The slider 108 includes both the writer 108a and sensor array 108b disposed along an air bearing surface (ABS) 108c of the slider. The ABS 108c is the bottom surface of the slider 108 and closest to the media 102. As will be discussed in further detail below, the sensor array 108b includes thin middle shields including a first middle shield assembly and a second middle shield assembly that can have different surface areas. This novel shape anisotropy can ensures additional stability of the magnetization orientations of the middle shields thus effectively controlling the magnetization dynamics of the soft bias without using a strong anti-ferromagnetic scheme. As a result, a balance between stability and shield performance is achievable, and the total thickness of middle shield stack structures can be reduced to an ultra thin level.

Figure 3:
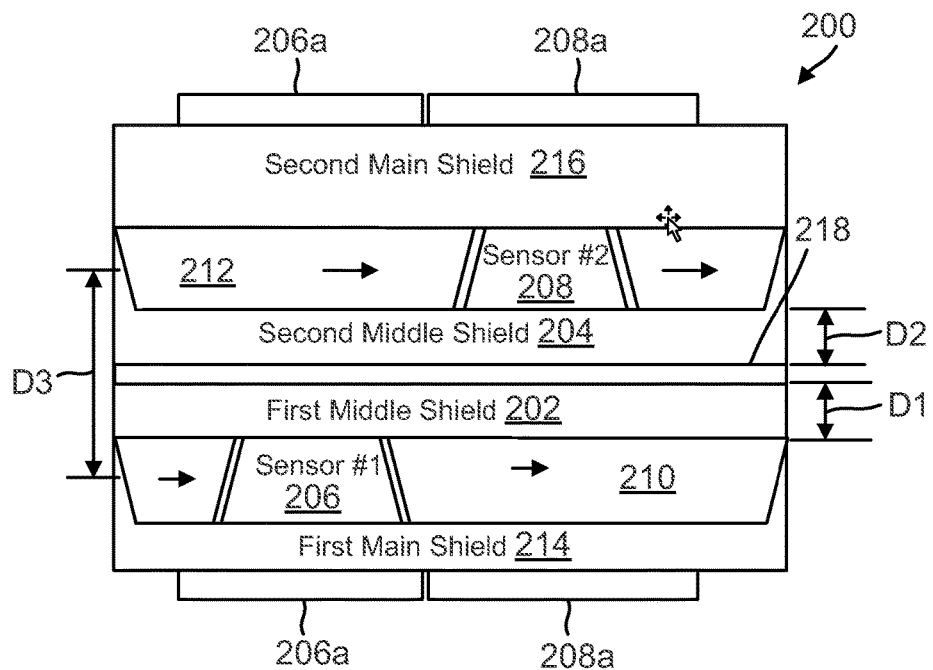
FIG. 3 is a bottom or air bearing surface (ABS) schematic view of a dual sensor array separated by thin middle shields, including a first middle shield assembly and a second middle shield assembly, in accordance with one embodiment of the invention.

FIG. 3 is a bottom or air bearing surface (ABS) schematic view of a dual sensor array 200 separated by thin middle shields including a first middle shield assembly 202 and a second middle shield assembly 204 in accordance with one embodiment of the invention. The dual sensor array 200 further includes a first read sensor 206 and a second read sensor 208 spaced apart laterally (for adjacent track reading) and vertically due to the first and second middle shield assemblies (202, 204). The first read sensor 206 is positioned within a first soft bias layer 210.

Similarly, the second read sensor 208 is positioned within a second soft bias layer 212. A first hypothetical track 206a that could be read by the first read sensor 206 is shown as extending from the bottom to the top of the dual sensor array 200. Similarly, a second hypothetical track 208a that could be read by the second read sensor 208 is shown as extending from the bottom to the top of the dual sensor array 200. The dual sensor array 200 further includes a first main shield 214 positioned at the bottom of the array 200 and a second main shield 216 positioned at the top of the array 200.

The first middle shield assembly 202 and the second middle shield assembly 204 can each be thought of as a stacked shield assembly. The dual sensor array 200 can be described as a stacked structure including, starting at the bottom, the first main shield layer 214 substantially parallel to the shield assembly (e.g., 202, 204), the first soft bias layer 210 on the first main shield layer 214, the second soft bias layer 212 substantially parallel to the stacked shield assembly (e.g., 202, 204), and the second main shield layer 216 on the second soft bias layer 212. In such case, the first read sensor 206 is positioned between a right side portion of the first soft bias layer 210 and a left side portion of the first soft bias layer 210 at the ABS. Similarly, the second read sensor 208 is positioned between a right side portion of the second soft bias layer 212 and a left side portion of the second soft bias layer 212 at the ABS. As shown in FIG. 3, the stacked structure would further include first middle shield assembly 202 on the first soft bias layer 210, a thin insulating layer 218 on the first middle shield assembly 202, the second middle shield assembly 204 on the insulating layer 218, and the second soft bias layer 212 on the second middle shield assembly 204.

In one embodiment, the first and second soft bias layers (210, 212) can be made of NiFe (e.g., permalloy), CoFe and/or other suitable material(s) known in the art. The first and second soft bias layers (210, 212) can provide soft biasing (.e.g., longitudinal biasing) for the respective sensors (206, 208). In one embodiment, the first and second main shield layers (214, 216) can also be made of NiFe (e.g., permalloy), CoFe and/or other suitable material(s) known in the art. In one embodiment, the insulating layer 218 can be made of Al2O3 (e.g., aluminum oxide), MgO, Si3N4 (e.g., silicon nitride) and/or other suitable material(s) known in the art.

In several embodiments, the thickness of the first middle shield assembly 202 (e.g., D1) and thickness of the second middle shield assembly 204 (e.g., D2) are substantially reduced as compared to prior middle shield designs. For example, in one embodiment, the thickness D1 of the first middle shield assembly 202 is about 35 nanometers (nm). In another embodiment, the thickness D1 is between about 15 nm and about 45 nm. In another embodiment, the thickness D1 is greater than 30 nm with a tolerance of about 4 nm. In several embodiments, thickness D1 is less than 40 nanometers.

In one embodiment, the thickness D2 of the second middle shield assembly 204 is about 25 nanometers (nm). In another embodiment, the thickness D2 is between about 15 nm and about 35 nm. In another embodiment, the thickness D2 is greater than 30 nm with a tolerance of about 2.5 nm. In several embodiments, thickness D2 is less than 40 nanometers.

In one embodiment, the distance D3 between the first soft bias layer 210 and the second soft bias layer 212 is about 70 nm. In another embodiment, D3 is less than 100 nm. In several embodiments, D3 is between about 60 nm and about 160 nm.

As can be seen in FIG. 3, the first read sensor 206 is spaced apart (e.g., laterally) from the second read sensor 208 along a direction substantially parallel to the shield assembly (e.g., middle shields 202, 204) to enable two dimensional magnetic recording. In several embodiments, the first middle shield assembly 202 and the second middle shield assembly 204 can be thought of as anti-ferromagnetic (AFM) middle shield assemblies.

Figure 4:
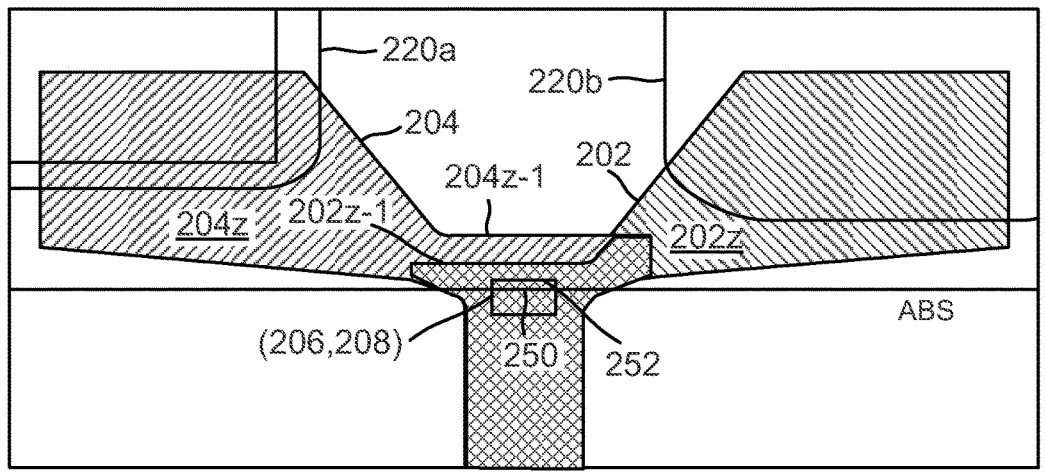
FIG. 4 is a top schematic view of the dual sensor array of FIG. 3 illustrating the shapes of the first middle shield assembly and the second middle shield assembly in accordance with one embodiment of the invention.

FIG. 4 is a top schematic view of the dual sensor array 200 of FIG. 3 illustrating the shapes of the first middle shield assembly 202 and the second middle shield assembly 204 in accordance with one embodiment of the invention. Leads (220a, 220b) for coupling to the dual sensor array 200 are also shown in this view. As can be seen in FIG. 4, the first middle shield assembly 202 has a first preselected footprint 202z (e.g., shape) with a first area, and the second middle shield assembly 204 has a second preselected footprint 204z (e.g., shape) with a second area. After the dual sensor array 200 is formed by removal of material from the first middle shield assembly 202 to about the air bearing surface or ABS (e.g., by lapping in a direction extending from the bottom to the top of FIG. 4), the second area 204z is greater than the first area 202z. In addition, it can be observed that the first footprint 202z is different from the second footprint 204z, and thus the first footprint 202z is not symmetric to the second footprint 204z. It can further be observed that each of the sensors (206, 208) are effectively between a majority of the first area (corresponding to first footprint 202z) and a majority of the second area (corresponding to second footprint 204z) in a cross track direction. Stated another way, it can be observed that a majority of the first area 202z is positioned to a first side (e.g., right side as shown in FIG. 4) of the first read sensor 206 in a cross track direction and a majority of the second area 204z is positioned to a second side (e.g., left side as shown in FIG. 4), opposite to the first side, of the first read sensor 206.

As shown in FIG. 4, the first sensor 206 has a first edge 250 at the ABS and a second edge 252 at a second surface substantially parallel to the ABS, where the first shield layer assembly footprint 202z has an edge 202z-1 substantially parallel to and closest to the second edge 252 of the first read sensor. That is closest as compared to the other edges of the first shield layer assembly footprint 202z. The second shield layer assembly footprint 204z also has an edge 204z-1 substantially parallel to and closest to the second edge 252 of the first read sensor 206 (closest as compared to the other edges of the second shield layer assembly footprint 204z). As such, the edge 202z-1 of the first shield layer assembly 202z is positioned between the edge 2024z-1 of the second shield layer assembly 204z and the second edge 252 of the first read sensor. While FIG. 4 depicts a particular embodiment of preselected shapes for the first middle shield assembly 202 and the second middle shield assembly 204, other suitable shapes may be used for the middle shield assemblies.

FIG. 5 is a side schematic view of the layer structure of the first middle shield assembly 202 of FIG. 3 in accordance with one embodiment of the invention. The first middle shield assembly 202 has a stacked structure including a first soft ferromagnetic layer 202a at the bottom of the stacked structure, a first anti-ferromagnetic exchange coupling enhancer layer 202b on the first soft ferromagnetic layer 202a, a first anti-ferromagnetic exchange coupling layer 202c on the first anti-ferromagnetic exchange coupling enhancer layer 202b, a second anti-ferromagnetic exchange coupling enhancer layer 202d on the first anti-ferromagnetic exchange coupling layer 202c, a second soft ferromagnetic layer 202e on the second anti-ferromagnetic exchange coupling enhancer layer 202d, a third anti-ferromagnetic exchange coupling enhancer layer 202f on the second soft ferromagnetic layer 202e, an anti-ferromagnetic pinning layer 202g on the third anti-ferromagnetic exchange coupling enhancer layer 202f, and a capping layer 202h on the anti-ferromagnetic pinning layer 202g.

In one embodiment, the first anti-ferromagnetic exchange coupling enhancer layer 202b, the first anti-ferromagnetic exchange coupling layer 202c, and the second anti-ferromagnetic exchange coupling enhancer layer 202d can collectively be referred to as an anti-ferromagnetic exchange coupling layer assembly (202b, 202c, 202d).

In one embodiment, the first soft ferromagnetic layer 202a can be made of NiFe (e.g., permalloy) and/or other suitable material(s) known in the art. In one embodiment, the first anti-ferromagnetic exchange coupling enhancer layer 202b can be made of CoFe and/or other suitable material(s) known in the art. In one embodiment, the first anti-ferromagnetic exchange coupling layer 202c can be made of Ru, Cr, and/or other suitable material(s) known in the art. In one embodiment, the second anti-ferromagnetic exchange coupling enhancer layer 202d can be made of CoFe and/or other suitable material(s) known in the art. In one embodiment, the second soft ferromagnetic layer 202e can be made of NiFe (e.g., permalloy) and/or other suitable material(s) known in the art. In one embodiment, the third anti-ferromagnetic exchange coupling enhancer layer 202f can be made of CoFe and/or other suitable material(s) known in the art. In one embodiment, the anti-ferromagnetic pinning layer 202g can be made of IrMn and/or other suitable material(s) known in the art. In one embodiment, the capping layer 202h can be made of Ta, Ru, combinations thereof, and/or other suitable material(s) known in the art.

In operation, the soft ferromagnetic layers (202a, 202e, 204a, 204c) can be used to block magnetic fields (e.g., shielding). The anti-ferromagnetic exchange coupling layers (202c, 204b) can be used to generate antiferromagnetic coupling. The anti-ferromagnetic exchange coupling enhancer layers (202b, 202d, 202f, 204a, 204c) can be used to enhance or optimize the coupling strength of the anti-ferromagnetic exchange coupling layers (202c, 204b) or enhance the effectiveness of the anti-ferromagnetic pinning layer 202g in pinning the magnetization of one or more of the adjacent soft ferromagnetic layers. In several embodiments, the optimization involves competing interests including minimizing the overall thickness of the sensor while maintaining a preselected base coupling strength. In such case, the thickness of each layer in the sensor can be adjusted for minimal thickness while maintaining a minimal acceptable degree of functionality (e.g., coupling strength for the respective layers).

In one embodiment, the first soft ferromagnetic layer 202a can have a thickness of about 10 nm to about 15 nm. In one embodiment, the first anti-ferromagnetic exchange coupling enhancer layer 202b can have a thickness of about 1 Angstrom to about 5 Angstroms. In one embodiment, the first anti-ferromagnetic exchange coupling layer 202c can have a thickness of about 7.5 Angstroms. In one embodiment, the second anti-ferromagnetic exchange coupling enhancer layer 202d can have a thickness of about 1 Angstrom to about 5 Angstroms. In one embodiment, the second soft ferromagnetic layer 202e can have a thickness of about 8 nm to about 10 nm. In one embodiment, the third anti-ferromagnetic exchange coupling enhancer layer 202f can have a thickness of about 1 Angstrom to about 8 Angstroms. In one embodiment, the anti-ferromagnetic pinning layer 202g can have a thickness of about 5 nm to about 7 nm. In one embodiment, the capping layer 202h can have a thickness of about 4 nm to about 8 nm. In several embodiments, these layers of the first middle shield assembly 202 can have other suitable thicknesses.

FIG. 6 is a side schematic view of the layer structure of the second middle shield assembly 204 of FIG. 3 in accordance with one embodiment of the invention. The second middle shield assembly 204 has a stacked structure including a first soft ferromagnetic layer 204a at the bottom, an anti-ferromagnetic exchange coupling layer 204b on the first soft ferromagnetic layer 204a, and a second soft ferromagnetic layer 204c on the anti-ferromagnetic exchange coupling layer 204b. The function of these layers is described above.

In one embodiment, the first soft ferromagnetic layer 204a can be made of NiFe (e.g., permalloy) and/or other suitable material(s) known in the art. In one embodiment, the anti-ferromagnetic exchange coupling layer 204b can be made of Ru, Cr, and/or other suitable material(s) known in the art. In one embodiment, the first soft ferromagnetic layer 204c can be made of NiFe (e.g., permalloy) and/or other suitable material(s) known in the art.

In one embodiment, the first soft ferromagnetic layer 204a can have a thickness of about 8 nm to about 12 nm. In one embodiment, the anti-ferromagnetic exchange coupling layer 204b can have a thickness of about 1 nm to about 5 nm. In one embodiment, the second soft ferromagnetic layer 204c can have a thickness of about 8 nm to about 12 nm. In several embodiments, these layers of the second middle shield assembly 204 can have other suitable thicknesses.

Referring now to FIGS. 5 and 6, the first shield layer assembly 202 has a first preselected number of layers (e.g., 8 layers) including a plurality of laminated soft ferromagnetic layers. The second shield layer assembly 204 has a second preselected number of layers (e.g., 3 layers) including a plurality of laminated soft ferromagnetic layers. In several embodiments, the first preselected number of layers does not equal to the second preselected number of layers. In one such embodiment, the first preselected number of layers is greater than the second preselected number of layers.

FIG. 7 is a bottom or air bearing surface (ABS) schematic view of a triple sensor array 300 where the sensors (306, 308, 324) are each separated by thin middle shields, including first (302), second (304), third (320) and fourth (322) middle shield assemblies, in accordance with one embodiment of the invention. Similar to the sensor array of FIG. 4, the triple sensor array 300 includes a first sensor 306 positioned within a first soft bias layer 310. The first middle shield assembly 302 is on the first soft bias layer 310, and the second middle shield assembly 304 is on the first middle shield assembly 302. A thin insulating layer 318 is positioned between the first middle shield assembly 302 and the second middle shield assembly 304. The second sensor 308 is positioned within a second soft bias layer 312. The third middle shield assembly 320 is on the second soft bias layer 312, and the fourth middle shield assembly 322 is on the third middle shield assembly 320. A thin insulating layer 328 is positioned between the third middle shield assembly 320 and the fourth middle shield assembly 322. The third sensor 324 is positioned within a third soft bias layer 326 which is on the fourth middle shield assembly 322. The triple sensor array 300 further includes a first main shield 314 beneath the first soft bias layer 310 and a second main shield 316 on the third soft bias layer 326.

In a number of embodiments, the triple sensor array can function in a similar manner as the sensor array of FIG. 3 but with the additional functionality provided by the third sensor 324. In several embodiments, the third shield layer assembly 320 has a third footprint with a third area, and the fourth shield layer 322 assembly has a fourth footprint with a fourth area, where the fourth area is greater than the third area.

Figure 8:
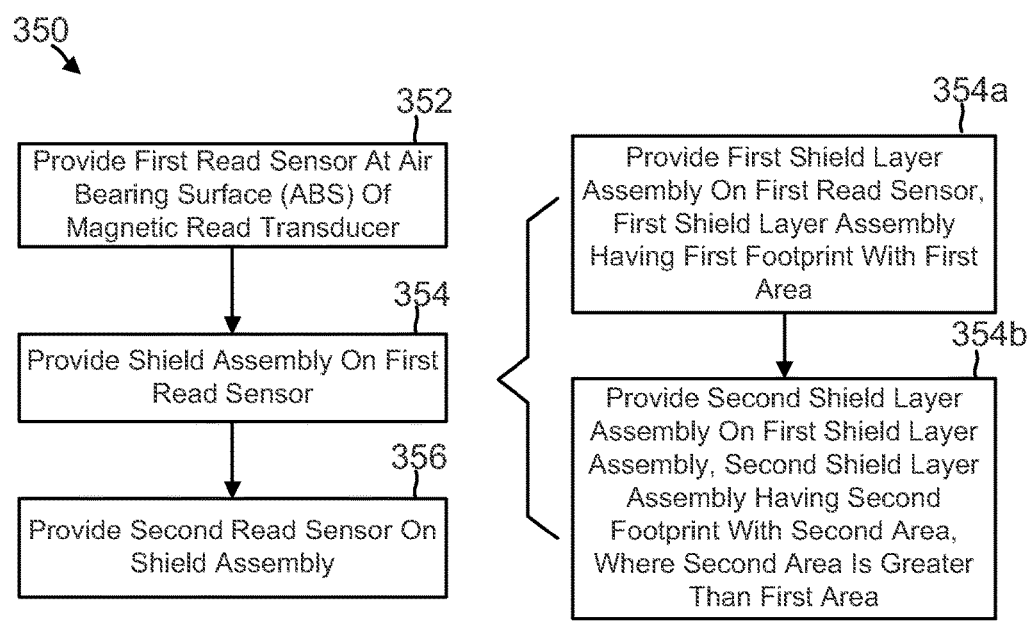
FIG. 8 is a flowchart of a process for forming a dual sensor array separated by thin middle shields, including a first middle shield assembly and a second middle shield assembly, in accordance with one embodiment of the invention.

FIG. 8 is a flowchart of a process 350 for forming a dual sensor array separated by thin middle shields, including a first middle shield assembly and a second middle shield assembly, in accordance with one embodiment of the invention. In particular embodiments, the process 350 can be used to fabricate the sensor array 200 of FIG. 3. In block 352, the process provides a first read sensor at an air bearing surface (ABS) of the magnetic read transducer. In block 354, the process provides a shield assembly on the first read sensor. As shown in sub-block 354a of block 354, the process provides a first shield layer assembly on the first read sensor, where the first shield layer assembly has a first footprint with a first area. As shown in sub-block 354b of block 354, the process provides a second shield layer assembly on the first shield layer assembly, where the second shield layer assembly has a second footprint with a second area, where the second area is greater than the first area. In block 356, the process provides a second read sensor on the shield assembly.

In one embodiment, the process can perform the sequence of actions in a different order. In another embodiment, the process can skip one or more of the actions. In other embodiments, one or more of the actions are performed simultaneously. In some embodiments, additional actions can be performed.

For example, in some embodiments, the process includes additional actions to form the sensor arrays of FIG. 3 or FIG. 7, including, in some cases, the middle shield assemblies of FIGS. 5 and 6. In other embodiments, the process includes additional actions to form additional read sensors with additional shield layer assemblies.

Figure 9:
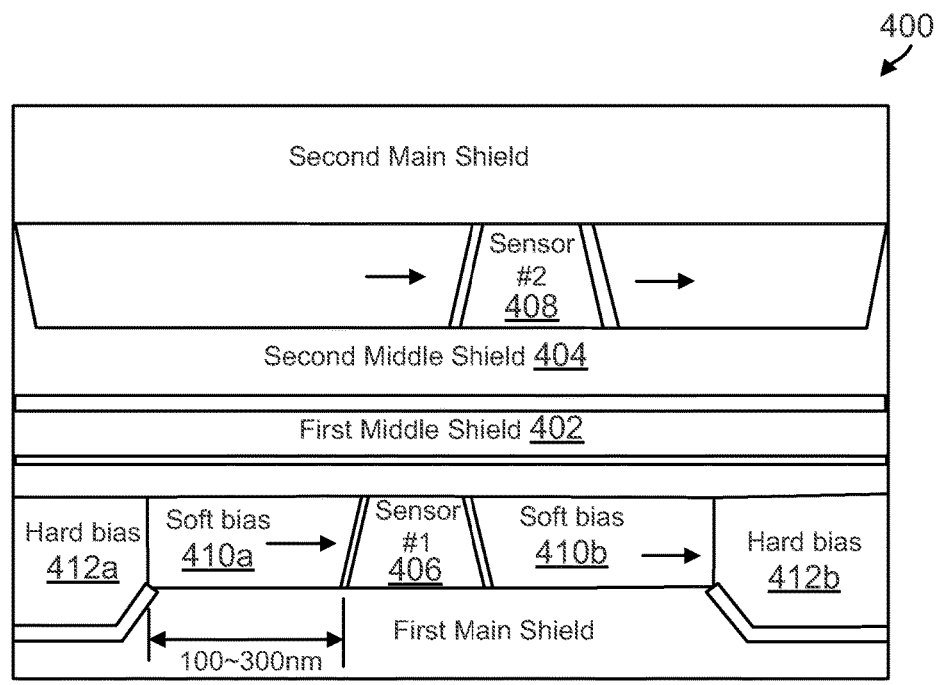
FIG. 9 is a bottom or air bearing surface (ABS) schematic view of a dual sensor array separated by thin middle shields, including a first middle shield assembly and a second middle shield assembly, where one of the sensors is stabilized using a hybrid soft and hard bias assembly in accordance with one embodiment of the invention.

FIG. 9 is a bottom or air bearing surface (ABS) schematic view of a dual sensor array 400 separated by thin middle shields, including a first middle shield assembly 402 and a second middle shield assembly 404, where one of the sensors is stabilized using a hybrid soft and hard bias assembly in accordance with one embodiment of the invention. More specifically, the dual sensor array 400 includes a first sensor 406 and a second sensor 408, where the first sensor 406 is stabilized using a hybrid soft and hard bias assembly including soft bias layer (410a, 410b) with a side hard bias layer (412a, 412b). The first read sensor 406 is positioned between a right side portion of the soft bias layer 410b and a left side portion of the soft bias layer 410a at the ABS. The soft bias layer (410a, 410b) is positioned between a right side portion of the hard bias layer 412b and a left side portion of the hard bias layer 412a at the ABS. The left side portion of the soft bias layer 410a and the right side portion of the soft bias layer 410b can have a length, between the sensor 406 and the hard bias layer (412a, 412b) at the ABS, of about 100 nm to about 300 nm. In other embodiments, other suitable lengths can be used. The hard bias layer (412a, 412b) can have a thickness greater than that of the soft bias layer (410a, 410b) at the ABS.

As can be seen in FIG. 9, a moderately coupled AFC stack structure is utilized where the hard bias layer is used to provide additional stability for the magnetization orientations of the first middle shield assembly 402, thus effectively controlling the magnetization dynamics of the soft bias without using a strong anti-ferromagnetic scheme. As a result, not only can the delicate balance between sensor's stability and shielding performance be achieved, but also the total thickness of the proposed AFC middle shield stack structures (e.g., 402 and 404) can be reduced drastically. This hybrid bias scheme also greatly improves the stability of the sensor array under external field disturbances due to the high coercivity (Hc) of hard bias layer.

In particular, the thin middle shield assemblies of FIG. 9 may cause a strength reduction of the AFC pinning and coupling which would likely affect the soft bias stability performance. To compensate for the stability impact associated with the loss or the reduction of the AFC pinning strength, the hybrid hard bias and soft bias scheme depicted in FIG. 9 can be adopted.

The introduction of an extra longitudinal field on the soft bias in the middle shield (e.g., first middle shield assembly 402) can improve or enhance the overall soft bias stability so as to compensate for the stability impact caused by the loss or the reduction of the AFC pinning strength. This unique hard bias stability is mainly achieved through the pinning at the end of the soft bias layer and the coupling between the first middle shield layer 402 and the hard ferromagnetic bias layer (412a, 412b).

Figure 10:
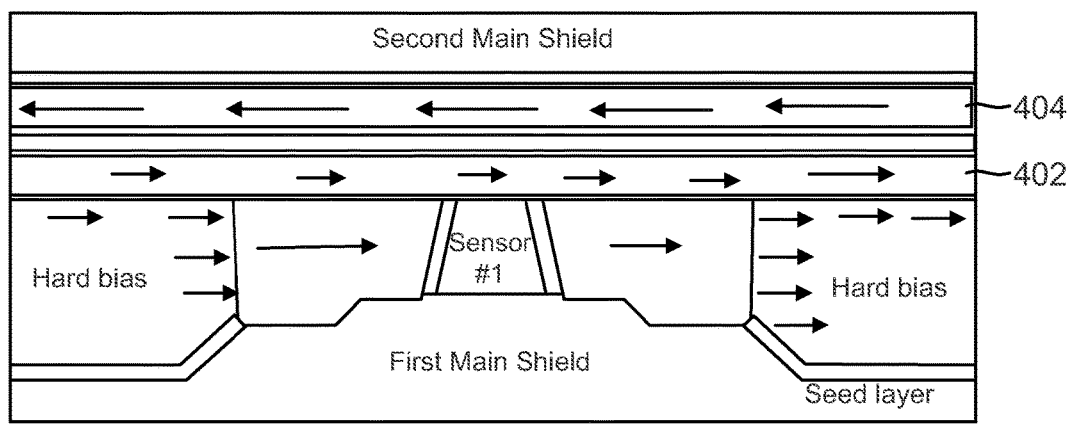
FIG. 10 is a bottom or air bearing surface (ABS) schematic view illustrating the magnetic effects associated with a sensor stabilized using a hybrid soft and hard bias scheme in accordance with one embodiment of the invention.

FIG. 10 is a bottom or air bearing surface (ABS) schematic view illustrating the magnetic effects associated with a sensor stabilized using a hybrid soft and hard bias scheme in accordance with one embodiment of the invention. It should be pointed out that the coercivity (Hc) of hard bias layer can be high (e.g., greater than 2000 Oe), which should improve the stability of the sensor array drastically under application of external fields as it becomes very robust under external perturbations.

Figure 11:
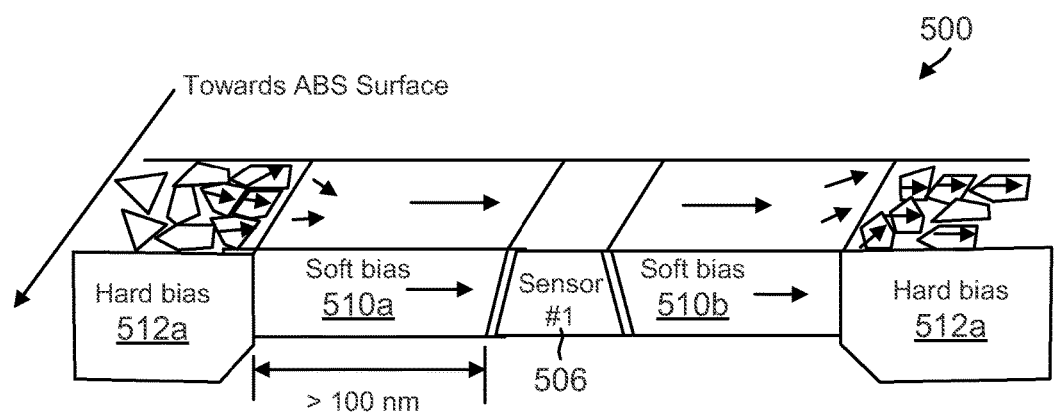
FIG. 11 is a schematic perspective view of a sensor assembly including a sensor stabilized using a hybrid soft and hard bias scheme and the magnetic effects associated therewith in accordance with one embodiment of the invention.

FIG. 11 is a schematic perspective view of a sensor assembly 500 including a sensor 506 stabilized using a hybrid soft and hard bias scheme and the magnetic effects associated therewith in accordance with one embodiment of the invention. The sensor assembly 500 includes soft bias layer portions (510a, 510b) to the left and right of the sensor 506, respectively, and hard bias layer portions (512a, 512b) to the left and right of the soft bias layer portions (510a, 510b), respectively. The left side portion of the soft bias layer 510a and possibly the right side portion of the soft bias layer 510b can have a length, between the sensor 506 and the hard bias layer (512a, 512b), of greater than 100 nm. In other embodiments, other suitable lengths can be used.

In many embodiments, the sensors are still biased by a hybrid scheme and especially in the vicinity of the free layer, and the sensor is biased by two soft magnets. The biasing field there is uniformly applied onto the free layer across the stripe height direction due to their shape anisotropy. On the other hand, the two soft bias layers (510a, 510b) are pinned at their ends by two high coercivity hard bias layers (512a, 512b) to enhance the overall stability. The localized non-uniform field from the hard bias layer generally will not reach to the sensor area if the soft bias layer is longer than 100 nm (as illustrated). The shape anisotropy of the soft layers and the AFM layer coupling together ensure the uniform field going into the sensors.

Figure 12:
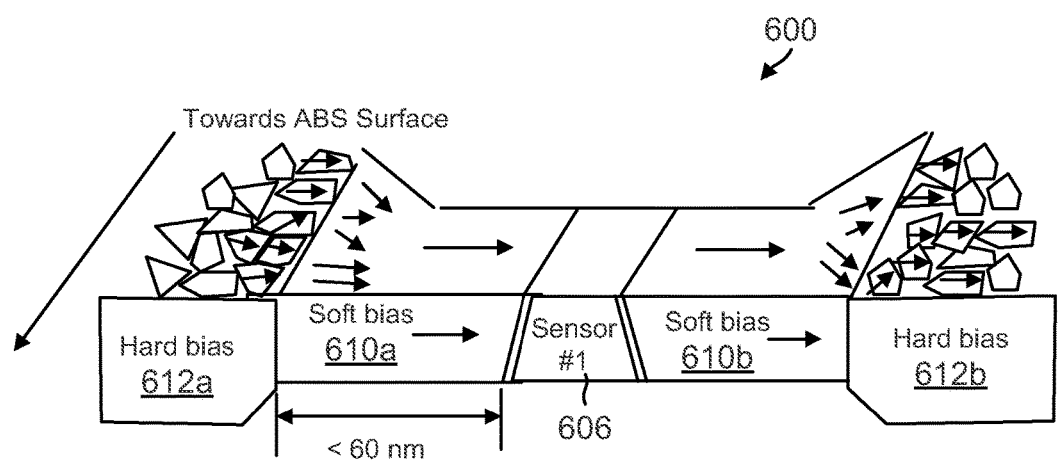
FIG. 12 is a schematic perspective view of a sensor assembly including a sensor stabilized using a hybrid soft and hard bias scheme and the magnetic effects associated therewith in accordance with one embodiment of the invention.

FIG. 12 is a schematic perspective view of a sensor assembly 600 including a sensor 606 stabilized using a hybrid soft and hard bias scheme and the magnetic effects associated therewith in accordance with one embodiment of the invention. The sensor assembly 600 includes soft bias layer portions (610a, 610b) to the left and right of the sensor 606, respectively, and hard bias layer portions (612a, 612b) to the left and right of the soft bias layer portions (610a, 610b), respectively. The left side portion of the soft bias layer 610a and possibly the right side portion of the soft bias layer 610b can have a length, between the sensor 606 and the hard bias layer (612a, 612b), of less than 60 nm. In other embodiments, other suitable lengths can be used.

For future ultra-high track density magnetic recording products, the magnetic thickness (MrT), which can be defined as the product of the remnant magnetic moment density (Mr) and the layer thickness (T), of the soft bias layer may become insufficient. In such case, one can reduce the length of the soft bias layer (e.g., make it less than 60 nm) and let the fields from both of hard bias layers and soft bias layer directly apply up to the free layer.

It can be very beneficial if hard biasing is used for providing a moderate pinning field for enhancing the soft bias along the longitudinal direction. This hard biasing can pin both the soft bias layer and the AFM middle shield layers together. Aspects of this design basically can address soft bias instability problems in conventional tunnel magneto-resistance (TMR) reader designs as well.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

A number of layered structures are discussed herein. In several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic read transducer comprising:
a first read sensor;
a second read sensor; and
a shield assembly positioned between the first read sensor and the second read sensor at an air bearing surface (ABS) of the magnetic read transducer in a down track direction, the shield assembly comprising:
a first shield layer assembly having a first footprint with a first area; and
a second shield layer assembly having a second footprint with a second area,
wherein the second area is greater than the first area, and
wherein a majority of the first area and a majority of the second area are positioned on opposite sides of the first read sensor in a cross track direction.

2. The magnetic read transducer of claim 1:
wherein first shield layer assembly comprises a first preselected number of layers comprising a plurality of laminated soft ferromagnetic layers; and
wherein second shield layer assembly comprises a second preselected number of layers comprising a plurality of laminated soft ferromagnetic layers.

3. The magnetic read transducer of claim 1:
wherein first shield layer assembly comprises a first preselected number of layers;
wherein second shield layer assembly comprises a second preselected number of layers; and
wherein the first preselected number of layers does not equal the second preselected number of layers.

4. The magnetic read transducer of claim 3, wherein the first preselected number of layers is greater than the second preselected number of layers.

5. The magnetic read transducer of claim 4, further comprising:

an insulating layer between the first shield layer assembly and the second shield layer assembly, wherein the first shield layer assembly comprises:
a first soft ferromagnetic layer;
an anti-ferromagnetic exchange coupling layer assembly on the first soft ferromagnetic layer;
a second soft ferromagnetic layer on the anti-ferromagnetic exchange coupling layer assembly;
an anti-ferromagnetic pinning layer on the second soft ferromagnetic layer; and
a capping layer on the anti-ferromagnetic pinning layer; and wherein the second shield layer assembly comprises:
a third soft ferromagnetic layer;
a second anti-ferromagnetic exchange coupling layer on the third soft ferromagnetic layer; and
a fourth soft ferromagnetic layer on the second anti-ferromagnetic exchange coupling layer.

6. The magnetic read transducer of claim 5:
wherein the anti-ferromagnetic exchange coupling layer assembly of the first shield layer assembly comprises:
a first anti-ferromagnetic exchange coupling enhancer layer;
a first anti-ferromagnetic exchange coupling layer on the first anti-ferromagnetic exchange coupling enhancer layer; and
a second anti-ferromagnetic exchange coupling enhancer layer on the first anti-ferromagnetic exchange coupling layer,
wherein the first shield layer assembly further comprises a third anti-ferromagnetic exchange coupling enhancer layer positioned between the second soft ferromagnetic layer and the anti-ferromagnetic pinning layer.

7. The magnetic read transducer of claim 1:
wherein the first shield layer assembly has a thickness of less than 40 nanometers; and
wherein the second shield layer assembly has a thickness of less than 40 nanometers.

8. The magnetic read transducer of claim 1:
wherein the first read sensor is spaced apart from the second read sensor along a direction substantially parallel to the shield assembly to enable two dimensional magnetic recording.

9. The magnetic read transducer of claim 8, further comprising:
a third read sensor;
a second shield assembly positioned between the second read sensor and the third read sensor, the second shield assembly comprising:
a third shield layer assembly having a third footprint with a third area; and
a fourth shield layer assembly having a fourth footprint with a fourth area,
wherein the fourth area is greater than the third area.

10. The magnetic read transducer of claim 1:
wherein the first read sensor comprises a first edge at the ABS and a second edge at a second surface substantially parallel to the ABS;
wherein the first shield layer assembly comprises an edge substantially parallel to and closest to the second edge of the first read sensor;
wherein the second shield layer assembly comprises an edge substantially parallel to and closest to the second edge of the first read sensor; and
wherein the edge of the first shield layer assembly is positioned between the edge of the second shield layer assembly and the second edge of the first read sensor.

11. The magnetic read transducer of claim 1, further comprising:
a first main shield layer substantially parallel to the shield assembly;
a first soft bias layer on the first main shield layer;
a second soft bias layer substantially parallel to the shield assembly; and
a second main shield layer on the second soft bias layer,
wherein the first read sensor is positioned between a right side portion of the first soft bias layer and a left side portion of the first soft bias layer at the ABS; and
wherein the second read sensor is positioned between a right side portion of the second soft bias layer and a left side portion of the second soft bias layer at the ABS.

12. The magnetic read transducer of claim 1, wherein the first footprint is not symmetric to the second footprint.

13. A magnetic read transducer comprising:
a first read sensor;
a second read sensor;
a shield assembly positioned between the first read sensor and the second read sensor at an air bearing surface (ABS) of the magnetic read transducer, the shield assembly comprising:
a first shield layer assembly having a first footprint with a first area; and
a second shield layer assembly having a second footprint with a second area,
wherein the second area is greater than the first area;
a soft bias layer substantially parallel to the shield assembly; and
a hard bias layer substantially parallel to the shield assembly,
wherein the first read sensor is positioned between a right side portion of the soft bias layer and a left side portion of the soft bias layer at the ABS; and
wherein the soft bias layer is positioned between a right side portion of the hard bias layer and a left side portion of the hard bias layer at the ABS.

14. A method of fabricating a magnetic read transducer, the method comprising:
providing a first read sensor at an air bearing surface (ABS) of the magnetic read transducer;
providing a shield assembly on the first read sensor, wherein the providing the shield assembly on the first read sensor comprises:
providing a first shield layer assembly on the first read sensor, the first shield layer assembly having a first footprint with a first area; and
providing a second shield layer assembly on the first shield layer assembly, the second shield layer assembly having a second footprint with a second area, wherein the second area is greater than the first area; and
providing a second read sensor on the shield assembly,
wherein a majority of the first area and a majority of the second area are positioned on opposite sides of the first read sensor in a cross track direction.

15. The method of claim 14:
wherein first shield layer assembly comprises a first preselected number of layers comprising a plurality of laminated soft ferromagnetic layers; and
wherein second shield layer assembly comprises a second preselected number of layers comprising a plurality of laminated soft ferromagnetic layers.

16. The method of claim 14:
wherein first shield layer assembly comprises a first preselected number of layers;

wherein second shield layer assembly comprises a second preselected number of layers; and
wherein the first preselected number of layers does not equal the second preselected number of layers.

17. The method of claim 16, wherein the first preselected number of layers is greater than the second preselected number of layers.

18. The method of claim 17, further comprising:
providing an insulating layer between the first shield layer assembly and the second shield layer assembly,
wherein the first shield layer assembly comprises:
   a first soft ferromagnetic layer;
   an anti-ferromagnetic exchange coupling layer assembly on the first soft ferromagnetic layer;
   a second soft ferromagnetic layer on the anti-ferromagnetic exchange coupling layer assembly;
   an anti-ferromagnetic pinning layer on the second soft ferromagnetic layer; and
   a capping layer on the anti-ferromagnetic pinning layer; and
wherein the second shield layer assembly comprises:
   a third soft ferromagnetic layer;
   a second anti-ferromagnetic exchange coupling layer on the third soft ferromagnetic layer; and
   a fourth soft ferromagnetic layer on the second anti-ferromagnetic exchange coupling layer.

19. The method of claim 18:
wherein the anti-ferromagnetic exchange coupling layer assembly of the first shield layer assembly comprises:
   a first anti-ferromagnetic exchange coupling enhancer layer;
   a first anti-ferromagnetic exchange coupling layer on the first anti-ferromagnetic exchange coupling enhancer layer; and
   a second anti-ferromagnetic exchange coupling enhancer layer on the first anti-ferromagnetic exchange coupling layer,
wherein the first shield layer assembly further comprises a third anti-ferromagnetic exchange coupling enhancer layer positioned between the second soft ferromagnetic layer and the anti-ferromagnetic pinning layer.

20. The method of claim 14:
wherein the first shield layer assembly has a thickness of less than 40 nanometers; and
wherein the second shield layer assembly has a thickness of less than 40 nanometers.

21. The method of claim 14:
wherein the first read sensor is spaced apart from the second read sensor along a direction substantially parallel to the shield assembly to enable two dimensional magnetic recording.

22. The method of claim 21, further comprising:
providing a third read sensor;
providing a second shield assembly positioned between the second read sensor and the third read sensor, the second shield assembly comprising:
   a third shield layer assembly having a third footprint with a third area; and
   a fourth shield layer assembly having a fourth footprint with a fourth area,
   wherein the fourth area is greater than the third area.

23. The method of claim 14:
wherein the first read sensor comprises a first edge at the ABS and a second edge at a second surface substantially parallel to the ABS;
wherein the first shield layer assembly comprises an edge substantially parallel to and closest to the second edge of the first read sensor;
wherein the second shield layer assembly comprises an edge substantially parallel to and closest to the second edge of the first read sensor; and
wherein the edge of the first shield layer assembly is positioned between the edge of the second shield layer assembly and the second edge of the first read sensor.

24. The method of claim 14, further comprising:
providing a first main shield layer substantially parallel to the shield assembly;
providing a first soft bias layer on the first main shield layer;
providing a second soft bias layer substantially parallel to the shield assembly; and
providing a second main shield layer on the second soft bias layer,
wherein the first read sensor is positioned between a right side portion of the first soft bias layer and a left side portion of the first soft bias layer at the ABS; and
wherein the second read sensor is positioned between a right side portion of the second soft bias layer and a left side portion of the second soft bias layer at the ABS.

25. The method of claim 14, wherein the first footprint is not symmetric to the second footprint.

26. A method of fabricating a magnetic read transducer, the method comprising:
providing a first read sensor at an air bearing surface (ABS) of the magnetic read transducer;
providing a shield assembly on the first read sensor, wherein the providing the shield assembly on the first read sensor comprises:
   providing a first shield layer assembly on the first read sensor, the first shield layer assembly having a first footprint with a first area; and
   providing a second shield layer assembly on the first shield layer assembly, the second shield layer assembly having a second footprint with a second area, wherein the second area is greater than the first area;
providing a second read sensor on the shield assembly;
providing a soft bias layer substantially parallel to the shield assembly; and
providing a hard bias layer substantially parallel to the shield assembly,
wherein the first read sensor is positioned between a right side portion of the soft bias layer and a left side portion of the soft bias layer at the ABS; and
wherein the soft bias layer is positioned between a right side portion of the hard bias layer and a left side portion of the hard bias layer at the ABS.

27. A magnetic read transducer comprising:
a first read sensor;
a second read sensor;
a shield assembly positioned between the first read sensor and the second read sensor at an air bearing surface (ABS) of the magnetic read transducer in a down track direction, the shield assembly comprising:
   a first shield layer assembly having a first footprint with a first area; and
   a second shield layer assembly having a second footprint with a second area,
   wherein the second area is greater than the first area, and
   wherein the first read sensor is positioned between a majority of the first area and a majority of the second area in a cross track direction.

28. A method of fabricating a magnetic read transducer, the method comprising:
providing a first read sensor at an air bearing surface (ABS) of the magnetic read transducer;
providing a shield assembly on the first read sensor, wherein the providing the shield assembly on the first read sensor comprises:
providing a first shield layer assembly on the first read sensor, the first shield layer assembly having a first footprint with a first area; and
providing a second shield layer assembly on the first shield layer assembly, the second shield layer assembly having a second footprint with a second area, wherein the second area is greater than the first area; and
providing a second read sensor on the shield assembly, wherein the first read sensor is positioned between a majority of the first area and a majority of the second area in a cross track direction.

* * * * *